June 10, 1930.  W. A. MARRISON  1,763,000
SYNCHRONOUS MOTOR
Original Filed May 3, 1923
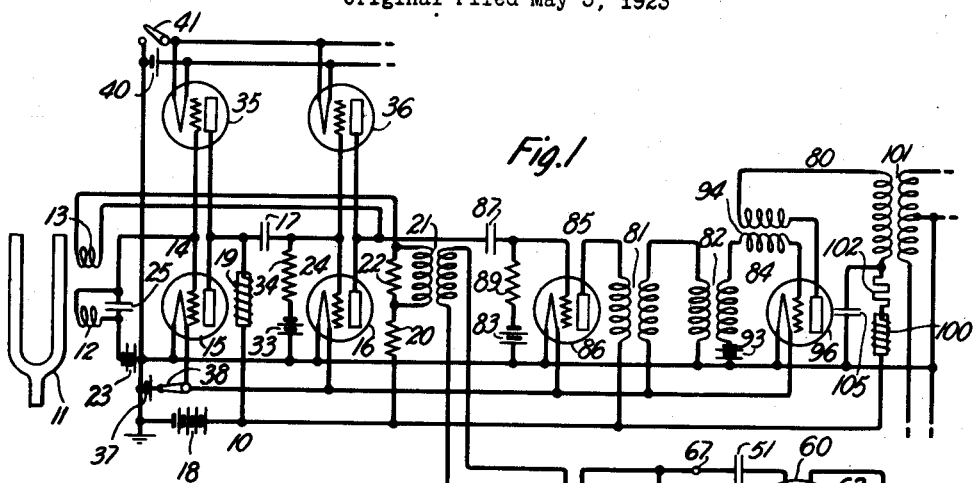
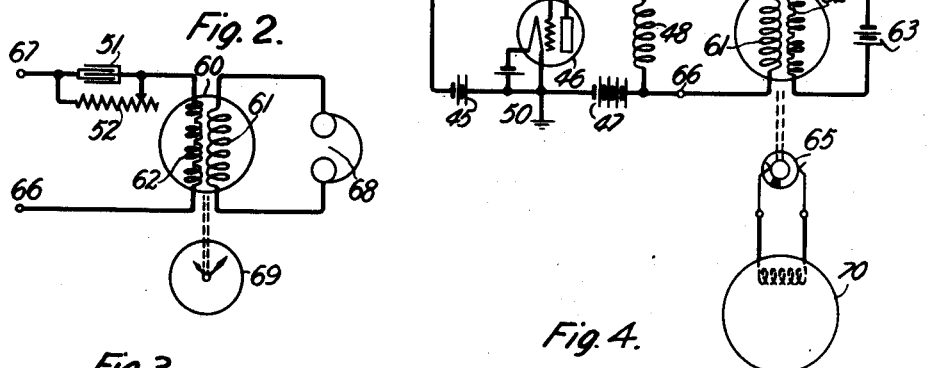
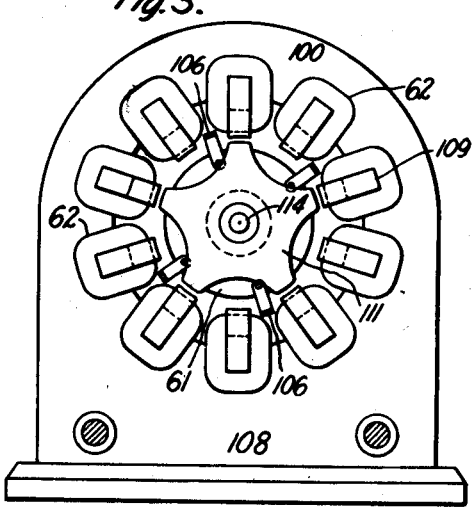
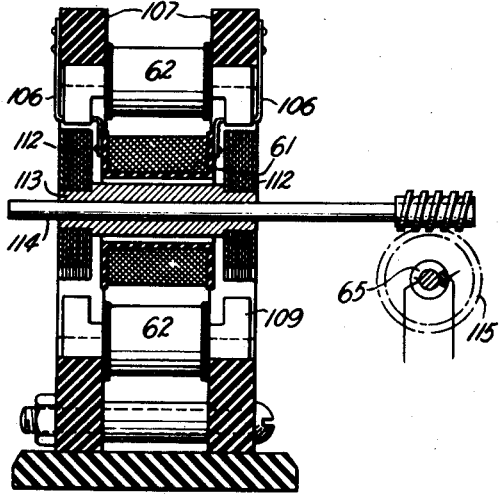
Inventor:
Warren A. Marrison
by E. W. Adams Atty.

Patented June 10, 1930

1,763,000

UNITED STATES PATENT OFFICE

WARREN A. MARRISON, OF BLOOMFIELD, NEW JERSEY, ASSIGNOR, BY MESNE ASSIGNMENTS, TO WESTERN ELECTRIC COMPANY, INCORPORATED, A CORPORATION OF NEW YORK

SYNCHRONOUS MOTOR

Original application filed May 3, 1923, Serial No. 636,364. Divided and this application filed March 31, 1925. Serial No. 19,580.

This invention relates to a source of waves of constant frequency and to a synchronous motor for utilizing such waves. This application is a division of application Serial No. 636,364, filed May 3, 1923, which eventuated into Patent No. 1,639,045, August 16, 1927.

The art of electrical communication has at its disposal such a wide variety of methods for the transmission of intelligence that it now employs alternating currents having frequencies which cover the entire range between a few cycles per second and several million. Refinements in these methods have reached a point where it is imperative that determinations of the frequency of any of these alternating currents may be made with an accuracy considerably higher than has been possible hitherto.

For example, in the field of radio broadcasting, it has already become necessary to establish a carefully planned assignment of wave lengths for the many stations now operating throughout the country. Great care must be exercised in maintaining these stations at their allotted frequency in order that the general scheme may be effective in preventing undue interference.

Recently introduced methods for multiplex telephony and telegraphy by means of carrier currents over wires have placed exceedingly rigorous limits on the frequency adjustment of certain types of apparatus. It is sometimes necessary to hold such circuits as oscillators and filters to within 0.1 percent of a given value under commercial operating conditions. It is, therefore, apparent that the calibrating devices used in the manufacture and maintenance of such circuits must be reliable to 0.01 percent and that the primary standard should be good to 0.001 percent.

An object of this invention concerns the design of a synchronous motor whereby high efficiency and exactness of synchronism may be secured.

A still further feature of this invention relates to improvements in a synchronous motor by which it is capable of being operated by an electric current having both direct and alternating components.

Another feature relates to novel means associated with a winding on a synchronous motor whereby synchronous speed may be indicated.

In order that a more comprehensive understanding of the nature of this invention may be obtained, reference should be made to the following detailed description considered in connection with the drawings in which: Fig. 1 is a schematic circuit of a system embodying one form of the invention; Fig. 2 is an alternative form of connection for the synchronous motor; and Fig. 3 is an end view of the synchronous motor; and Fig. 4 is a side view of the motor partly in section.

In the system of Fig. 1 the synchronous motor, which is the subject of this invention, is illustrated in the lower right-hand corner and is identified by reference numerals 60 to 63. In order to best indicate the utility of the motor, it will be described in connection with a description of that system, in which it is well adapted to function. Referring to Fig. 1, a tuning fork oscillator 10 comprises a tuning fork 11 positioned adjacent to electromagnets 12 and 13 connected respectively to the input circuit of vacuum tube 15 and the output circuit of vacuum tube 16. The output circuit of vacuum tube 15 is connected to the input circuit of the vacuum tube 16 by way of condenser 17. The output circuit of tube 15 is supplied with energy from battery 18 through series impedance 19. The output circuit of tube 16 is also supplied with energy from battery 18 through resistance 20, the primary of transformer 21 and resistance 22 in parallel and winding of electromagnet 13.

Electromagnet 12 is connected in series with the polarizing battery 23 to the input circuit 14 of vacuum tube 15 and is shunted by a low capacity condenser 25. Input circuit 24 of vacuum tube 16 is polarized by battery 33 in series with resistance 34.

Reserve electron tubes 35 and 36 have their plate and grid electrodes connected respectively to the plate and grid electrodes of tubes 15 and 16. A battery 37 in series with switch 38 supplies energy for heating the filaments of tubes 15 and 16. Battery 40 may supply current for heating the filaments of tubes 35 and 36 by way of switch 41. Tubes 35 and 36 may be substituted for tubes 15 and 16 without affecting the character of the oscillations generated in the tuning fork oscillator by first closing switch 41 and subsequently opening switch 38.

The substitution of tubes 35 and 36 for tubes 15 and 16 as required when one or both of the latter tubes deteriorate or when the batteries associated therewith require to be changed.

An amplifier 50 comprises a space discharge tube 46 which is supplied with waves from the secondary of transformer 21 which is connected in series with a grid polarizing battery 45 in the input circuit of tube 46. The output circuit of tube 46 is supplied with direct current energy from battery 47 through impedance coil 48, and alternating current energy is supplied from the output circuit of vacuum tube 46 to the synchronous motor 60, by leads connected to the terminals 66 and 67 of coil 48.

Synchronous motor 60 comprises a rotor winding 61 which derives energy from a circuit containing condenser 51 connected across the terminals of coil 48. The stator winding 62 of motor 60 is supplied with direct current energy from battery 63. The commutator 65 is driven by motor 60 and has its brushes forming a portion of the circuit of an electromagnetic device 70 which may be, for example, an electric clock.

A harmonic generator 80 derives energy from tuning fork oscillator 10 by way of a second amplifier 85, the input circuit of which is directly connected to the plate and filament of tube 16 by way of condenser 87. Amplifier 85 comprises a three-element vacuum tube 86 having its grid electrode polarized by a battery 83 connected in series with resistance 89. The output circuit of amplifier 85 which is connected to the plate electrode of tube 86 is supplied with energy from battery 18 in series with the primary winding of transformer 82.

Harmonic generator 80 comprises an input circuit 84 between the grid and filament of tube 96. The input circuit 84 comprises the filament of tube 96, battery 93, secondary winding of transformer 82 and the secondary winding of transformer 94 and grid of tube 96. The output circuit of harmonic generator 80 includes in series the cathode and plate of tube 96 and is supplied with energy from battery 18 in series with impedance coil 100, high resistance 102, primary of transformer 101 and primary winding of transformer 94. A condenser 105 is connected in shunt about resistance 102, impedance 100 and battery 18. Energy may be derived from the output circuit of harmonic producer 80 through the secondary winding of transformer 101.

In the operation of this system, tuning fork 11 is set into vibration in any desired manner and continues in vibration under the action of driving magnet 13. The vibration of the tuning fork 11 causes the reluctance of the magnetic path of receiver magnet 12 to be varied. This variation introduces a variation in the potential applied to the grid of vacuum tube 15. Condenser 25 is connected in shunt to the winding of electromagnet 12 to compensate for small phase displacement in the remainder of the system. The capacity of condenser 25 should be of such value that the circuit formed by coil 12 and condenser 25 will not be resonant at a frequency in the neighborhood of that of the tuning fork 11. This varying potential results in the production of a similar variation in the current in the output circuit of tube 15. A consequent variation in the potential across the input electrodes of tube 16 is produced whereby the output current in the plate circuit of tube 16, which includes the winding of magnet 13, undergoes a corresponding variation.

The tuning fork 11 is the only resonant element and the frequency of the vibrations in the output current of tube 16 is controlled entirely by the vibration of the tuning fork. In order that constant frequency energy may be supplied from the tuning fork oscillator without reaction from the load circuits tending to cause a change in the frequency of vibrations, tubes 86 and 46 are provided. The input circuit of tube 46 is coupled to the output circuit of the tuning fork oscillator by transformer 21. The input circuit of tube 86 is connected to the output circuit of the tuning fork oscillator by a direct capacity coupling. Constant frequency oscillations from the tuning fork oscillator are consequently transmitted to amplifier 50 and from it to the rotor winding 61 of synchronous motor 60.

In harmonic generator 80, the coupling between the windings of transformer 94 is so arranged that when current in the output circuit of tube 96 is increasing, the grid potential is increased. The battery 93 which may be adapted to supply from 4.5 to 20 volts is provided in the grid circuit to furnish a sufficient negative potential to prevent a flow of current in the plate current under conditions when no varying current is supplied to the input circuit by transformer 82.

Normally, no current is flowing in the plate circuit and so condenser 105, which may have a capacity from .01 to .001 microfarads, is charged through the high resistance 102 to the potential of the battery 18. When the input wave becomes sufficiently positive the potential impressed upon the grid becomes so positive that plate current flows. This action takes place suddenly. The increased current flowing through the winding of the transformer 94 serves to further increase the positive potential impressed upon the grid and hence causes more plate current to flow. This action is cumulative so that the charge which has been stored in the condenser 105 is suddenly discharged. When the potential between the plates of condenser 105 has fallen to such an extent that the space discharge through tube 96 cannot be maintained at the amplitude to which it has attained, the decrease in space current causes an electromotive force to be set up in the secondary winding of transformer 94 in such direction as thereby to further reduce the space current in an exceedingly abrupt manner. The resistance of element 102 and the capacity of the condenser 105 are so chosen that the condenser becomes charged during the time the grid potential is below the value required to cause a flow of space current. This process repeats for each cycle of the input wave. Thus at each positive peak of the input wave, we obtain an abrupt discharge of the condenser, giving a wave in which the variations occur during a period very small in comparison with the whole cycle. It is well known that such a wave is made up of a fundamental with a large number of harmonics. Energy of the fundamental and harmonic frequencies may be obtained from the transformer 101 by connection to either pair of leads shown. By means of this invention several hundred harmonics that are integral multiples of the input wave may be obtained.

Fig. 2 indicates an alternative method of connecting the synchronous motor 60. Condenser 51 permits the free passage of alternating current to the stator winding 62. The value of the capacity of this condenser is so chosen as to annul the inductive reactance of stator winding 62. Resistance 52 allows the passage of a definite amount of direct current. Receiver 68 may be connected to the winding of the rotor 61 and serves as a means for indicating when the motor is running at synchronous speed. The beats produced between the alternating input and the alternating current produced by the motor acting as a generator stop when synchronous speed is reached. 69 represents the clock mechanism directly driven from the shaft of motor 60.

Figs. 3 and 4 show in detail the construction of the synchronous motor 60. The stator 108 comprises magnets 100 having windings 62 upon U-shaped laminated cores 109. The stator magnets 100 are arranged in circular form and held in position by supporting members 107 which are preferably of insulating material, for example bakelite. The windings 62 of magnets 100 are so connected that considering either end of the motor any two adjacent poles are of opposite polarity. The rotor 111 comprises two discs 112 which may be of laminated steel machined with five projections as shown. The discs 112 are mounted on a core 113 preferably of soft iron which may be bored for a shaft 114 and slotted radially to reduce eddy-current losses. The rotor 111 rotates freely within a stationary coil 61 closely associated therewith. The coil and rotor are both mounted within and concentric with the stator 108. The coil 61 serves to energize the rotor 111. The shaft 114 passes through the soft iron core 113 and is fitted with a worm gear 115 which may serve to drive the commutator or interrupter 65.

The synchronous motor 60 may be operated in various ways. In one method, illustrated by Fig. 1, alternating current is supplied to the coil 61 making all the poles on either end of the rotor alternately north and south. Direct current is at the same time supplied to coils 62 for polarizing stator cores 109.

If now the rotor is turned up to synchronous speed, that is, one revolution for five cycles of the tuning fork 11, the motor will pull into step.

Frictional losses may be made small by using ball bearings and by filling in the spaces between the rotor poles to reduce air friction.

A feature of this invention relates to the rotor coil 61. This coil is fixed in position and consequently exerts no additional force upon the motor bearings and obviates the necessity of using brushes as would be necessary if the coil 61 were attached to the rotor 111 in the customary manner. Straps 106 attached to supporting members 107 hold coil 61 in position.

In an alternative method of operating the synchronous motor, illustrated by Fig. 2, no current need be supplied to rotor energizing winding 61 but a periodically varying current may be supplied to the coils 62 of the stator. This current may include a direct component having an alternating component superimposed thereupon. The direct component serves to polarize the stator coils while the alternating component causes the rotation of the rotor.

In the operation of the motor the ratio of direct current to alternating current is preferably so adjusted that the flux in the magnetic circuits does not reverse at any time. The advantage gained by this fact is that hysteresis losses are reduced to a minimum. The optimum ratio of direct current to alternating current input to the motor may be obtained by adjustment of resistance 52 of Fig. 2.

Although this invention has been illustrated and described in connection with certain specific embodiments it is clear that numerous other practical applications may be made. The invention is therefore to be limited only by the scope of the appended claims.

What is claimed is:

1. The combination with a source of varying electrical current comprising an unvarying component and an alternating component of a synchronous motor comprising a stator winding energized by said varying current, a rotor maintained in motion by the action of said stator, and an energizing winding for said rotor in inductive relation to the first mentioned winding.

2. The method of operating a synchronous motor having a rotatable inductor and a stator having a magnetizing circuit which comprises supplying direct current to said magnetizing circuit, and superimposing upon the direct current an alternating current, to cause the inductor to rotate at a speed determined by the frequency of the alternating current.

3. A synchronous motor having a rotatable inductor and a polarized driving magnetizing circuit therefor, and a source of alternating current so connected to said circuit as to cause the inductor to rotate at a speed determined by the frequency of the alternating current.

4. A synchronous motor, having a rotatable inductor and a pair of driving electromagnets therefor oppositely polarized, and a source of alternating current coupled to the electromagnets to render the electromagnets alternately effective during succeeding half cycles, to cause the rotation of the inductor at a speed determined by the frequency of the alternating current.

5. A synchronous motor having a rotatable inductor and a pair of driving electromagnets therefor, means including a source of direct current to oppositely polarize said electromagnets, and a source of alternating current so coupled to said electromagnets as to render them alternately effective during succeeding half cycles, to cause the rotation of said inductor at a speed determined by the frequency of the alternating current.

6. The combination with a source of varying electrical current comprising an unvarying component and an alternating component of a synchronous motor comprising a stator winding energized by said varying current, a rotor maintained in motion by the action of said stator, and a stationary energizing winding for said rotor in inductive relation to the first mentioned winding.

In witness whereof, I hereunto subscribe my name this 30th day of March A. D., 1925.

WARREN A. MARRISON.